(12) United States Patent
Rathi (10) Patent No.: US 7,844,710 B2
(45) Date of Patent: Nov. 30, 2010

(54) PROXY CACHING FOR DIRECTORY SERVICES

(75) Inventor: Pradeep Kumar Rathi, Bangalore (IN)

(73) Assignee: Novell, Inc., Provo, UT (US)

( * ) Notice: Subject to any disclaimer, the term of this patent is extended or adjusted under 35 U.S.C. 154(b) by 311 days.

(21) Appl. No.: 11/888,726

(22) Filed: Aug. 2, 2007

(65) Prior Publication Data

US 2008/0209040 A1 Aug. 28, 2008

(30) Foreign Application Priority Data

Feb. 27, 2007 (IN) .......................... 417/DEL/2007

(51) Int. Cl.
*G06F 15/16* (2006.01)
(52) U.S. Cl. .................................... 709/226
(58) Field of Classification Search .................. 709/226
See application file for complete search history.

(56) References Cited

U.S. PATENT DOCUMENTS

| 5,151,989 | A | | 9/1992 | Johnson et al. |
| 5,544,345 | A | * | 8/1996 | Carpenter et al. ........... 711/150 |
| 5,991,810 | A | * | 11/1999 | Shapiro et al. .............. 709/229 |
| 6,037,129 | A | | 3/2000 | Cole et al. |
| 6,101,541 | A | | 8/2000 | Ellesson et al. |
| 6,272,593 | B1 | | 8/2001 | Dujari |
| 6,345,266 | B1 | | 2/2002 | Ganguly et al. |
| 6,347,312 | B1 | | 2/2002 | Byrne et al. |
| 6,680,942 | B2 | | 1/2004 | Mead et al. |
| 7,016,945 | B2 | | 3/2006 | Bellaton et al. |
| 7,035,846 | B2 | | 4/2006 | Gupta et al. |
| 2003/0067912 | A1 | | 4/2003 | Mead et al. |
| 2003/0084104 | A1 | * | 5/2003 | Salem et al. ................. 709/205 |
| 2003/0163550 | A1 | * | 8/2003 | Ramanathan et al. ........ 709/219 |
| 2004/0059719 | A1 | * | 3/2004 | Gupta et al. .................... 707/3 |
| 2005/0033669 | A1 | * | 2/2005 | Stremler et al. ............... 705/30 |
| 2006/0075035 | A1 | * | 4/2006 | Tripp ......................... 709/206 |
| 2006/0075059 | A1 | | 4/2006 | Drepper |
| 2007/0157315 | A1 | * | 7/2007 | Moran .......................... 726/23 |
| 2007/0192444 | A1 | * | 8/2007 | Ackaouy et al. ............. 709/219 |
| 2007/0244987 | A1 | * | 10/2007 | Pedersen et al. ............. 709/217 |
| 2008/0028436 | A1 | * | 1/2008 | Hannel et al. .................. 726/1 |

* cited by examiner

*Primary Examiner*—Wing F Chan
*Assistant Examiner*—Tesfay Yohannes
(74) *Attorney, Agent, or Firm*—Schwegman, Lundberg & Woessner, P.A.

(57) ABSTRACT

Proxy caching for directory services are presented. Requests for directory resources are intercepted and an inspection of cache is made to determine whether a resource being requested is identified in cache. When an identifier for the resource is identified in cache, a corresponding directory service associated with a cache entry for that resource is used to supply the resource; otherwise the resource is supplied by a directory service selected by policy.

25 Claims, 3 Drawing Sheets

PROXY CACHING FOR DIRECTORY SERVICES

RELATED APPLICATION

The present application claims priority to India Patent Application No. 417/DEL/2007 filed in the India Patent Office on Feb. 27, 2007 and entitled "PROXY CACHING FOR DIRECTORY SERVICES;" the disclosure of which is incorporated by reference herein.

FIELD

The invention relates generally to directory processing and more particularly to proxy caching for directory services.

BACKGROUND

Enterprises have becoming geographically dispersed throughout the entire globe. Consequently, enterprises have developed a variety of data solutions for purposes of making enterprise data, automated services, and information available around the clock from any location and device having network access.

For some enterprises the directory of services and information can be voluminous, and the available services and information can often be accessed by multiple simultaneous users over the network. To address this performance issue, an enterprise may replicate services and information associated with one environment to another environment. In this manner, multiple environments are replicas of one another and can each simultaneously supply services and information to users over the network.

For example, a user may contact a particular directory service to locate a resource of the directory. That directory service is distributed and may be associated with a particular replica. In this manner, some users can be serviced off of different replicas or some users can be routed from one replica to another. This architecture permits an enterprise to more efficiently load balance and improve processing throughput of its directory and its associated services and information.

One problem that may arise is when a particular resource, such as resource R, is natively modified within one environment, such as environment X, and shortly after the modification, a user makes a request for R from within a different environment or replica, such as environment Y. If the change to R in X has not synchronized to Y at the time of the request, then the user will not get the correct version of R from Y or if R was originally non existent, then the user will receive an error message.

Another problem that may arise is with login attempts being made by a user. Typically, to ensure security a directory service will temporarily disable an id and password combination for a user if three consecutive incorrect id and password pairs are supplied to the directory service. If an intruder is aware of the various distributed replicas, then an intruder could contact multiple replicas of directory services at the same time to log into a user's account. This circumvents the security policy and permits an intruder to try more than an administrator-defined amount of times to guess an id and password combination.

Thus, it is advantageous to provide improved techniques for supplying distributed directory services.

SUMMARY

In various embodiments, proxy caching for directory services is provided. More particularly and in an embodiment, a method to identify a service having the most recent version of a directory resource is presented. A request is received to retrieve a directory resource. Proxy cache is inspected for the presence of a distinguished name specified in the request and associated with the directory resource. The request is routed to a remote environment having an up-to-date version of the directory resource when the distinguished name is present in the cache.

DETAILED DESCRIPTION

A "resource" or "directory resource" represents entities of a directory, such as but not limited to, representations for users, files, groups, directories, devices, programs, services, geographical locations, storage locations, etc. Sometimes the resources or entities may be referred to as "directory objects." The objects are organized hierarchically, such as in a tree structure. Each node of the tree represents an entry for a particular object. Each entry includes a set of attributes. An attribute includes a name, such an attribute type or description, and one or more values. The attributes collectively may be defined in a schema. Each object entry also includes a unique identifier referred to as its Distinguished Name (DN), which includes a full path of a current object from its topmost parent in the tree to its tree entry within the directory.

According to an embodiment, the "proxy" is a reverse proxy used to improve Lightweight Directory Access Protocol (LDAP) operations for a distributed directory. However, it is to be understood that a "proxy" may be any special type of service that acts on behalf of other resources (users, programs, devices, etc.) A proxy may be a transparent proxy in which case the resource that the proxy acts on behalf is not preconfigured and is not aware of the existence and actions of the proxy. A proxy may also be a forward proxy in which case the resource is configured to directly submit requests through the proxy. A proxy may also be a reverse proxy (as mentioned above within the LDAP context), such as when it acts on behalf of a service provider and from the environment of the service provider. With a reverse proxy, requests made over a network directed to a service provider are handled by the reverse proxy in a local environment of the service provider. With a transparent or forward proxy, requests sent from the client are intercepted before being sent over the network to a service provider.

In some embodiments, a distributed directory system is used having a plurality of distributed services. Each distributed service operates within a different environment over a wide area network (WAN), such as the Internet or such as multiple directory replicas connected using a private Local Area Network (LAN). Each environment includes a replica or set of defined resources of the directory. In this manner, each directory service is capable of providing a particular directory resource to a requestor from its own managed environment.

According to an embodiment, the distributed directory system and the services and resources described herein use a lightweight directory access protocol (LDAP). Thus, a variety of operations can be communicated and performed, such as but not limited to, starting transport layer security (TLS) services, binding for authentication a client (one resource) to a server (another resource), searching for resources, comparing resources, adding resources, deleing resources, modifying resources, abandoning requests, extending operations to user defined operations, and unbinding for closing connections between a client (one resource) and a server (another resource).

A "request" may be any directory service operation being made by one resource, such as a user, client or automated program, with respect to another resource, such as a server, program, device, etc. In some cases, these operations are the LDAP operations described above.

According to an embodiment, the techniques for proxy caching or directory services described herein and below are implemented within or as a part of eDirectory®, which is distributed by Novell, Inc. of Provo, Utah.

Of course it is to be understood that any network architecture, device, proxy architecture, operating system (OS), or product may be enhanced to utilize and deploy the techniques presented herein and below.

Figure 1:
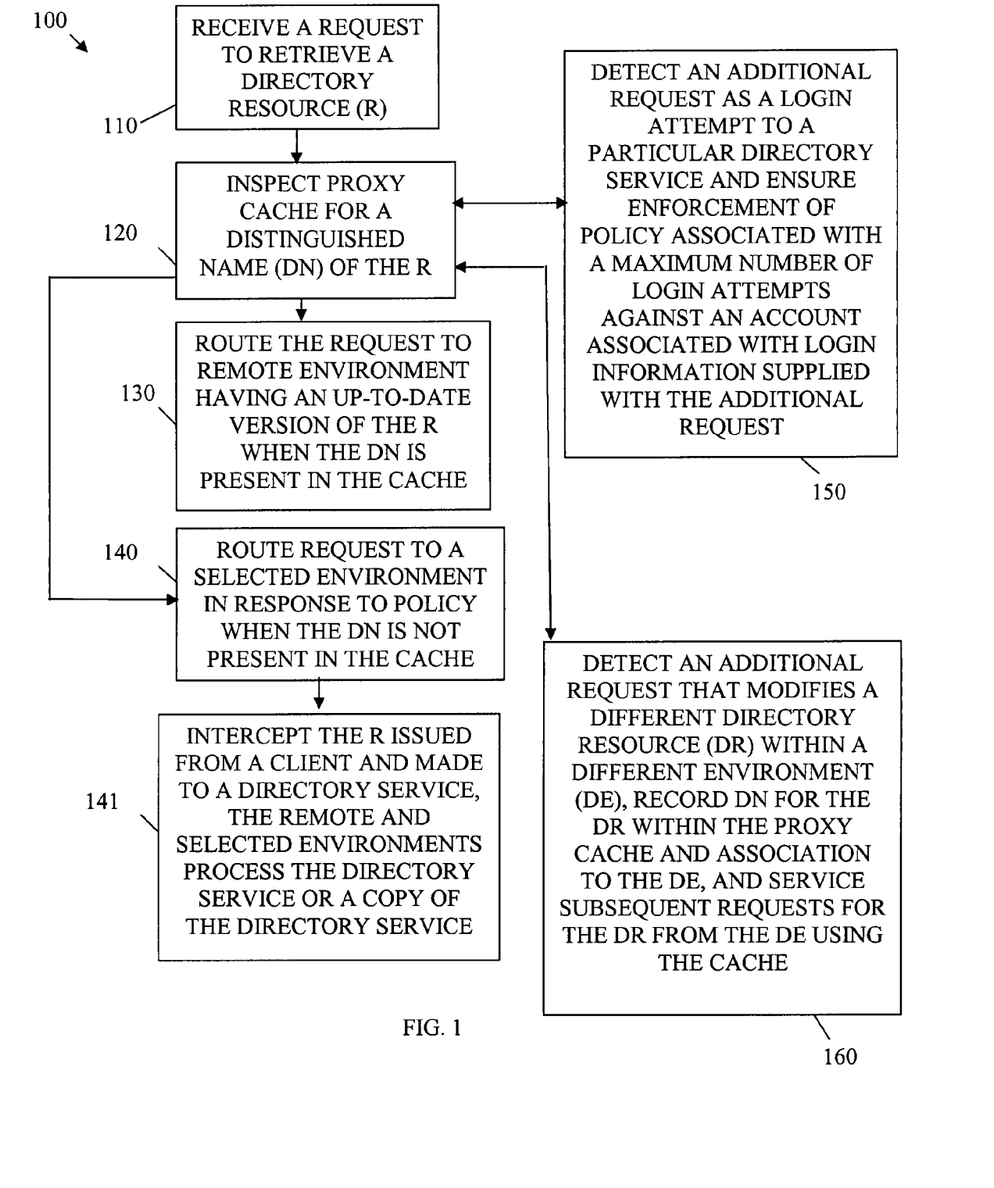
FIG. 1 is a diagram of a method for supplying a directory resource, according to an example embodiment.

FIG. 1 is a diagram of a method 100 for supplying a directory resource, according to an example embodiment. The method 100 (hereinafter "directory proxy service") is implemented in a machine-accessible and machine-readable medium and is accessible over a network. The network may be wired, wireless, or a combination of wired and wireless.

In an embodiment, the directory proxy service is implemented on a machine that operates as a transparent proxy with respect to clients of a distributed directory system. Communications with the directory proxy service occurs via LDAP and requests sent from clients to directory services are intercepted and processed unbeknownst to the clients via the directory proxy service.

At 110, the directory proxy service receives a request to retrieve a directory resource. This may be any type of LDAP request in which an updated resource is being requested for use by a requester, such as a client or a user. The requestor makes the request to a particular directory service, such as one assigned to the requestor or one known to the requestor. The directory system includes a plurality of distributed directory services, each of which is associated with its own environment having a replica of the directory resources and can service the requestor from that replica. The request is intercepted by the directory proxy service and processed in the manner discussed herein and below.

At 120, the directory proxy service inspects a proxy cache for a distinguished name (DN) associated with the directory resource being requested with the request. The DN is a full path of the resource being requested within the distributed directory system; it may thusly be viewed as a unique identifier for the resource.

If the proxy cache includes the DN of the resource being requested, then the directory proxy service knows that the resource being requested has been added or modified in some manner by a previous transaction and from a specific environment or replica and that the resource has not yet completely synchronized with each of the available replicas and with each of the environments or directory services associated with those replicas.

In prior techniques when such an event occurred (a resource was modified but not yet synchronized to each of the directory replicas) the requestor may end up with a resource that is not up-to-date; that is the servicing directory service may be unaware of the change to the resource and a pending synchronization. Thus, the resource was out of synch.

Here, when a change is made to a resource but the change has not yet been properly synchronized, the user can still acquire the up-to-date version of the resource. This is done by recording the change, which is not yet synchronized, in a cache by noting the DN of the resource and its association to a particular environment or directory service that made the most recent and as of yet unsynchronized change.

In this manner, at 130, the request for the resource is checked by the directory proxy service and the resource's DN is found in the proxy cache. Along with the DN is an association to remote environment or directory service that has the up-to-date version of the resource. The request is then routed to this remote environment and directory service to acquire the resource. Thus, requestors are assured that they receive the most recent and up-to-date version of resources with each request made within a distributed directory system.

In some cases, at 140, the directory proxy service may not detect a DN for the resource being requested in the proxy cache. So, the directory proxy service may use policy to decide where to route the requester to acquire the resource. When the DN for the resource is not in the proxy cache, the resource can be acquired from any available or servicing directory service and environment of the distributed directory system. Policy may drive which particular environment or directory service is selected. At 141, it may be that the request was intercepted (as discussed above) when issued from a client and made to a particular directory service. The remote environment and the selected environment each process the directory service or a copy of the directory service.

According to an embodiment, at 150, the directory proxy service may also detect additional requests as login attempts being made to bind or authenticate a client to a particular server or directory service. Since requests for resources are being processed initially by the directory proxy service, the directory proxy service can facilitate or ensure that login policy is centrally enforced for a maximum number of administrator or policy-defined number of login attempts against an account associated with login information. Suppose that login policy permits three login attempts, such that after three consecutive failed login attempts the credentials are reset for a given account. In a conventional distributed directory environment an intruder could issue login attempts to multiple different login services and could circumvent a policy that permits only three failed attempts before the account associated with the attempts is locked down. Here, such a situation could not occur and can be detected, because the intruder will have each request filtered initially through the directory proxy service. So, if the intruder attempted to use a first login service to process a login and then attempted to simultaneously submit a login request to a second login service, the directory proxy service would route both request through the first login service and ignore the request to route through the second login service from the intruder. This ensures that that the login policy is centrally enforced by the first login service and prevents the intruder from circumventing login policy.

In another case, at 160, the directory proxy service may detect addition requests that modify a different directory resource within a different environment. The directory proxy service notes a DN for the different resource and an identity of the different environment or directory service in the proxy cache as an entry. Subsequent requests for the different resource can be serviced from the environment having the most recent change by inspecting and utilizing the DN and the association to that environment. Once a modified resource is synchronized to each environment of the distributed directory system, the directory proxy service removes any DN entries for that resource from the proxy cache.

It is to be noted that the processing associated with 150 and 160 may occur initially as does 110. Thus, the diagram is not intended to depict any particular order of operation with respect to the processing depicted at 110, 150, and 160, since each of these can occur in any order.

It is also noted that the directory proxy service permits more efficient and accurate administration of a distributed directory than what has been done in the past. Specifically, this is achieved by temporarily housing references to modified resources in a proxy cache, such as an LDAP proxy cache, these references point to the specific directory services having the most-resent and most up-to-date versions or copies of those resources, and requests for resources are routed through the directory service. So, if a resource is modified but has not yet been synchronized and updated to each directory replica in the distributed directory when an incoming request is received, the requestor can still receive the most-recent copy of the resource because the directory service maintains a reference to the resource in the cache and the reference identifies the replica having the up-to-date version for the resource.

Figure 2:
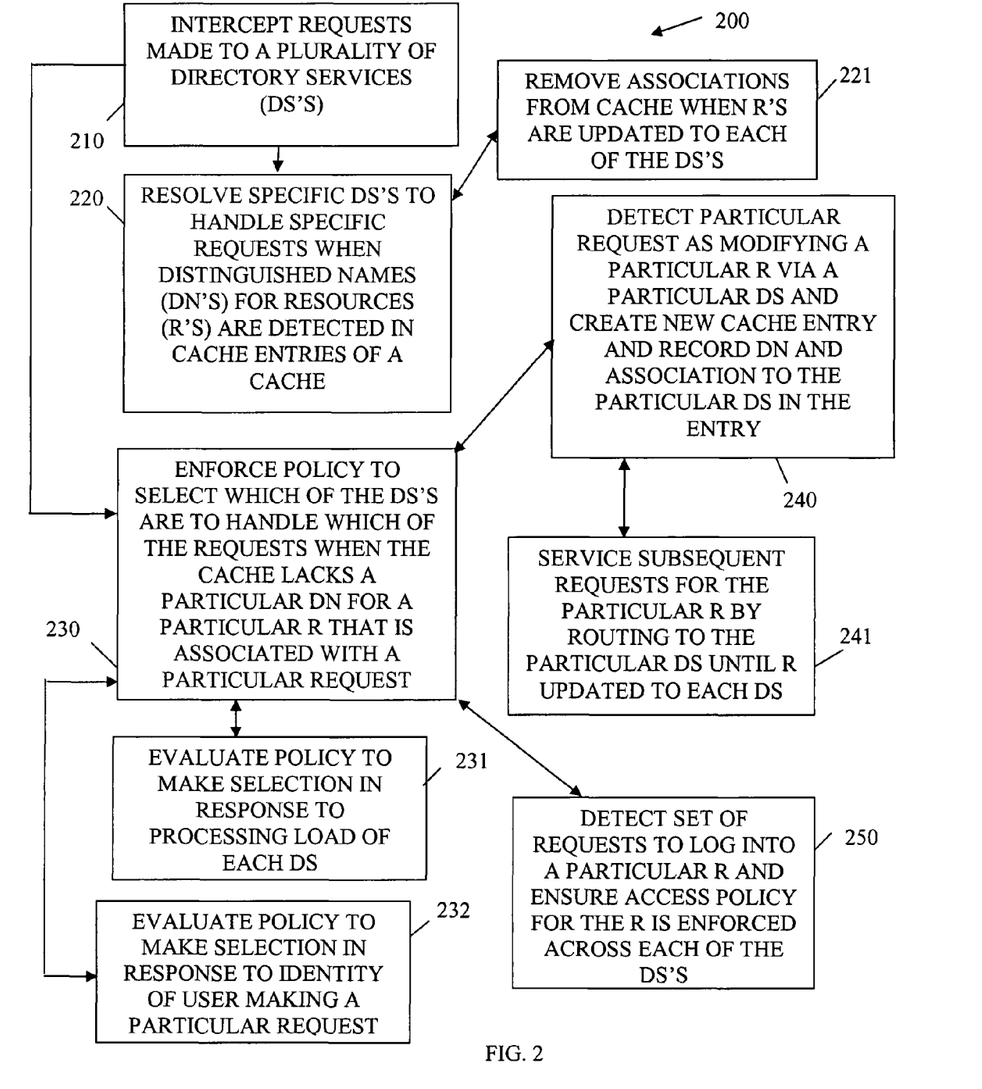
FIG. 2 is a diagram of a method for processing distributed directory services, according to an example embodiment.

FIG. 2 is a diagram of a method 200 for processing distributed directory services, according to an example embodiment. The method 200 (hereinafter "distributed directory caching service") is implemented in a machine-accessible and readable medium and is accessible over a network. The network may be wired, wireless, or a combination of wired and wireless. The distributed directory caching service presents an alternative perspective to the directory proxy service represented by the method 100 of the FIG. 1 and in some cases an enhanced perspective.

At 210, the distributed directory caching service intercepts requests made to a plurality of directory services. Each directory service is responsible for managing and distributing a set of directory resources within its environment or replica of the distributed directory. Requestors, which are also a type of directory resource, issue requests or operations (perhaps in LDAP format) to specific directory services to acquire resources or modify resources in some manner. The distributed directory caching service intercepts each of these requests unbeknownst to the requestors and the directory services and processes the requests in the manners described herein.

At 220, the distributed directory caching service inspects a proxy cache for resolving which directory services are to handle which requests when distinguished names (DN's) of the resources that are associated with the requests are detected within cache entries of the cache. As was described above in detail, this is an indication that a particular resource having a DN in the cache has been modified and has not yet been synchronized to each of the available directory services and their environments. The cache entry having the DN also provides the association, link, or identifier to a particular directory service having the most recent and up-to-date resource.

At 221, the associations between DN's and specific directory services are removed from the cache when the resources associated with the DN's are updated to each of the directory services associated with the distributed directory system. In other words, once the distributed directory caching service receives notification (e.g., such as through LDAP persistent searching or Novell® eDirectory® event mechanism, etc.) that each directory service has an updated version of a particular resource, then the DN associated with that resource and its entry are removed from the cache.

At 230, the distributed directory caching service enforces policy to select which of the directory services are to handle which of the resources when the cache lacks a particular DN for a particular R associated with a particular request. In other words, when a request is received and the resource associated with the request does not have a DN entry in the cache, then the distributed directory caching service uses policy to decide which directory service or environment can be used to service the desired request and resource on behalf of the original requestor (client, user, automated program, etc.).

According to an embodiment, at 231, the distributed directory caching service may evaluate the policy to make the selection of a particular directory service in response to processing loads associated with the available directory services or their environments. Thus, policy may be used to load balance the replicas and the directory services when a resource is properly synchronized and updated with the distributed directory system.

In another case, at 232, the distributed directory caching service may evaluate policy and make a selection of a particular directory service in response to an identity associated with a user making the particular request. So, policy may be driven by identity attributes. It may also be that policy is driven by the DN of the resource, such that maybe only selective directory services or environments can service a particular requested resource. The distributed directory caching service can use identity driven policy to resolve which directory service is to be used to service a request, when the resource being requested is synchronized and updated within the distributed directory system.

In an embodiment, at 240, the distributed directory caching service may also detect when a particular request has modified a particular resource via a particular environment or directory service. In such a situation, the distributed directory caching service creates a cache entry in the proxy cache and records a DN for the resource along with the particular environment or directory service having access to the most recent and up-to-date resource.

Accordingly, at 241, the distributed directory caching service may subsequently service requests for the particular resource by routing clients or requesters to the particular directory service associated with that resource, as recorded in the cache and indexed within the cache by that resource's DN. Once the resource is synchronized within the distributed directory to each directory service and environment that it should be synchronized with, the distributed directory caching service removes the cache entry and the DN of that resource from the cache.

In some embodiments, at 250, the requests may be LDAP binds, such as client-server authentication requests for a client-server communication session. The distributed directory caching service may detect a set of these requests being directed to a particular resource (server) and may ensure that a single access policy or global access policy is enforced across each of the directory services or environments, such as by routing these to a same authentication service regardless of what was requested. So, an intruder could not attempt to authenticate with multiple different directory services more than an allowed number of times and avoid detection because the distributed directory caching service services the set of requests centrally and ensures enforcement of policy across each of the directory services as a whole.

Figure 3:
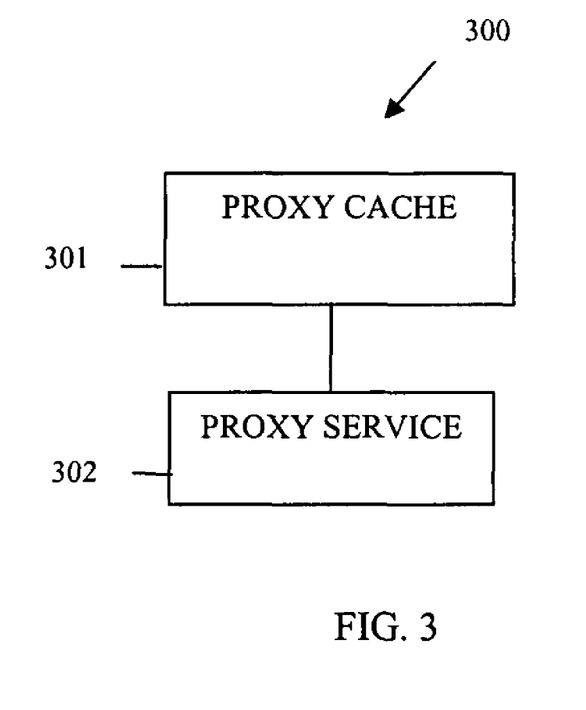
FIG. 3 is a diagram of a distributed directory proxy caching system, according to an example embodiment.

FIG. 3 is a diagram of a distributed directory proxy caching system 300, according to an example embodiment. The distributed directory proxy caching system 300 is implemented in a machine-accessible and readable medium and is accessible over a network. The network may be wired, wireless, or a combination of wired and wireless. In an embodiment, the distributed directory proxy caching system 300 implements, among other things, various aspects of the methods 100 and 200 of the FIGS. 1 and 2, respectively.

The distributed directory proxy caching system 300 includes a proxy cache 301 and a proxy service 302. Each of these and their interactions with one another will now be discussed in turn.

The proxy cache 301 is implemented within memory of a machine and is used to house a variety of data structures or entries. It is noted that the proxy cache 301 may also use a file system or other storage when memory is not sufficient to house the data structures or entries. Each entry within the proxy cache 301 includes a distinguished name (DN) of a particular distributed directory resource and an association or link to a particular directory service or environment from which the resource can be acquired. An entry is created when a resource is modified but has not yet properly synchronized throughout the entire distributed directory system to the proper environments or directory services that can supply that resource. An entry is flushed or destroyed from the proxy cache 301 when a particular resource has been properly synchronized within the distributed directory system. The proxy service 302 manages the proxy cache 301.

The proxy service 302 is implemented as instructions on the machine and manages the proxy cache 301. Additionally, the proxy service 302 intercepts or otherwise receives requests made from some resources of the distributed directory system, such as users, clients, automated services, and processes them in manners described above with the methods 100 and 200 of the FIGS. 2 and 3, respectively. The requests are operations (perhaps in LDAP format) being made by the requesting resources to retrieve, process, or bind with other directory resources. The requesting resource is unaware of the proxy service 302. Thus, in some embodiments, the proxy service 302 may be viewed as a transparent proxy implementation. The requesting resource believes that it is making direct requests to a specific directory service that can handle the requests. The requesting resource does not realize that the requests are actually intercepted and being processed in a centralized manner by the proxy service 302.

When a request is received, the proxy service 302 inspects it for a distinguished name (DN) or a resource associated with the request. Next, the proxy service 302 inspects the proxy cache 301 for an entry having the DN. If such an entry exists, then the proxy service 302 routes the requestor to the directory service associated with the entry so that the requestor can get an up-to-date version of the requested resource. If there is no entry, then the proxy service 302 uses policies to determine which directory service are to assist the requestor in supplying the resource. Examples of this processing were described in detail above with reference to the methods 100 and 200 of the FIGS. 1 and 2, respectively.

It may also be the case, that the request is a bind or authentication attempt between a client (requesting resource) and a server (desired resource). In such a situation, the proxy service 302 may ensure that a global login or access policy is applied against all requests made associated with this particular bind or authentication relationship. In this manner, the intent and spirit of an authentication or access policy can be accomplished within a distributed directory system having multiple directory services that can perform the bind or authentication on behalf of the parties.

In an embodiment, the proxy service 302 is a LDAP enabled service that is configured to handle LDAP requests being made from clients and directed to LDAP directory services. In some cases, the proxy service 302 is a reverse proxy. The LDAP directory services are configured to operate and cooperate to form a distributed directory system. Each directory resource is replicated to distributed environments within the distributed directory system. Also, each directory service handles requests for a particular or a particular set of distributed environments.

In some cases, the proxy service 302 may also perform load balancing among the distributed environments by enforcing policy. Additionally, the proxy service 302 may enforce login restrictions to selective resources across each of the distributed environments and each of the distributed directory services.

Figure 4:
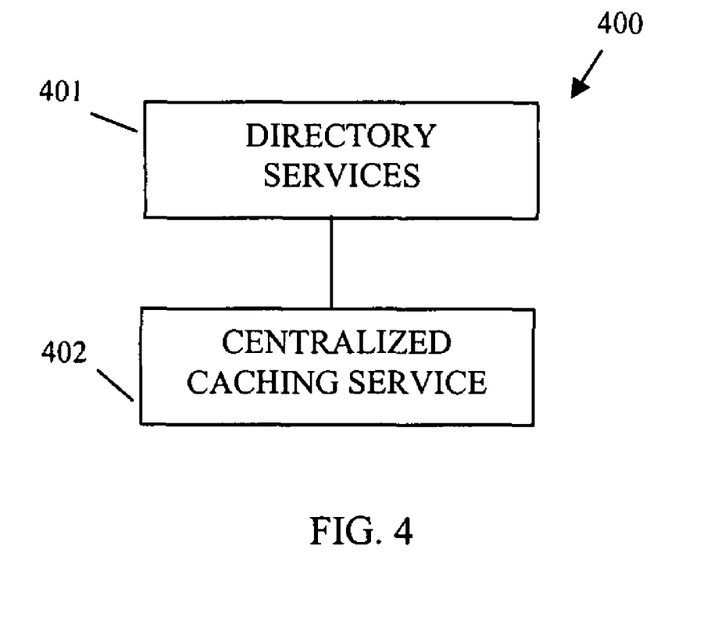
FIG. 4 is a diagram of another distributed directory proxy caching system, according to an example embodiment.

FIG. 4 is a diagram of another distributed directory proxy caching system 400, according to an example embodiment. The distributed directory proxy caching system 400 is implemented in a machine-accessible and readable medium is accessible over a network. The network may be wired, wireless, or a combination of wired and wireless. In an embodiment, the distributed directory proxy caching system 400 implements various aspects associated with the methods 100 and 200 of the FIGS. 1 and 2, respectively, and the system 300 of the FIG. 3.

The distributed directory proxy caching system 400 includes a plurality of directory services 401 and a centralized caching service 402. Each of these and their interactions with one another will now be discussed in detail.

Each directory service 401 is configured to process on a machine and is responsible for one or more environments or replicas associated with a distributed directory system. Each environment or replica includes a set of directory resources. Each directory service 401 can process LDAP requests received from requestors (type of resource, such as client, user, automated program, etc.) to deliver resources or update resources of the replica or replicas that each directory service 401 manages.

The centralized caching service 402 is implemented on a particular machine of the network and processes on that machine. The centralized caching service 402 is to manage identities to particular directory resources and their associations with particular ones of the directory services 401 for which changes have been made but are as of yet unsynchronized with each of the directory services 401 of the distributed directory system.

The centralized caching service 402 is to also route requestors of the particular directory resources to particular directory services 401 when references to the identities appear in the cache. In other words, the distinguished name (DN) for a resource may appear in the cache with an identity to a particular directory service 401. This indicates that the resource has been changed within the environment or replica of the directory service 401 and has not yet been synchronized to the remaining environments of the remaining directory services 401. When the resource is synchronized the centralized caching service 402 flushes or removes the DN and directory service 401 association from the cache.

If a requested resource does not have a corresponding DN in the cache, then the centralized caching service 402 uses policy to route a requestor to a particular directory service 401.

In an embodiment, the centralized caching service 402 may also handle requests associated with LDAP binding, such as a login process using authentication between a client and a server. The centralized caching service 402 can ensure that global policy is applied across each directory service 401 and multiple requests to ensure that the policy cannot be circumvented by an intruder. This can be done by routing multiple bind requests through the same login service regardless of what was specifically requested.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a proxy, comprising:
   receiving, by the proxy, a request to retrieve a directory resource, the request is a distributed directory system operation issued to the directory resource;
   inspecting, by the proxy, proxy cache for a distinguished name associated with the directory resource, when the distinguished name is present in the cache, the proxy knows that the directory resource was added or modified by a previous transaction and that directory resource has not yet been synchronized with each available replica of a distributed directory system; and
   routing, by the proxy, the request to a remote environment having an up-to-date version of the directory resource when the distinguished name is present in the cache, and the distinguished name identifies the remote environment in a cache entry that includes the distinguished name and the remote environment includes the up-to-date version of the directory resource that can process the distributed directory system operation, and the remote environment is one of the replicas of the distributed directory system, and when the distinguished name is not present in the cache, the distributed directory system operation is routed to any of the replicas, each replica having the directory resource to process the distributed directory system operation.

2. The method of claim 1 further comprising, routing, by the proxy, the request to a selected environment in response to policy when the distinguished name is not present in the cache.

3. The method of claim 2, wherein receiving further includes intercepting the request issued from a client and made to a directory service, and wherein the remote environment and the selected environment processes the directory service or a copy of the directory service.

4. The method of claim 1 further comprising, removing, by the proxy, the distinguished name from the proxy cache when the up-to-date version of the directory resource is determined to have been synchronized to a plurality of environments and is available on the plurality of environments in addition to the remote environment.

5. The method of claim 1 further comprising:
   detecting, by the proxy, an additional request as a login attempt being made to a particular directory service; and
   ensuring, by the proxy, enforcement of a policy associated with a maximum number of login attempts against an account associated with login information supplied with the additional request, wherein the policy is maintained and enforced for multiple other requests and for a determined period of time.

6. The method of claim 1 further comprising:
   detecting, by the proxy, an additional request that modifies a different directory resource within a different environment;
   recording, by the proxy, a distinguished name for the different directory resource within the proxy cache along with the association to the different environment; and
   servicing, by the proxy, subsequent requests made for the different directory resource from the different environment using a cache entry having the association.

7. The method of claim 6 further comprising, removing, by the proxy, the association from the cache entry when the modified and different directory resource is synchronized and updated to each of a plurality of environments that comprise the distributed directory system.

8. A machine-implemented method to execute on a proxy, comprising:
   intercepting, by the proxy, requests made to a plurality of directory services, the requests are distributed directory system operations made to the plurality of directory services;
   resolving, by the proxy, specific ones of the directory services that are to handle specific ones of the requests when distinguished names for resources associated with the specific ones of the requests are detected in cache entries of a cache, each cache entry having an association between a particular distinguished name and a particular one of the directory services, each cache entry representing a specific resource that has been added or modified by one of the directory services and not yet synchronized to a distributed directory system, and each cache entry representing a remote environment for a replica for the distributed directory system, and the remote environment includes the up-to-date version of the specific resource that can process the distributed directory system operations, and the remote environment is one of the replicas of the distributed directory system, and when the distinguished names are not present in the cache, the distributed directory system operations are routed to any of the replicas, each replica having the specific resource to process the distributed directory system operations; and
   enforcing, by the proxy, policy to select which of the directory services are to handle which of the requests when the cache lacks a particular distinguish name for a particular resource that is associated with a particular request.

9. The method of claim 8, wherein receiving further includes, removing the associations from the cache when the resources are detected as being updated to each of the directory services.

10. The method of claim 8 further including:
    detecting, by the proxy, a particular request as modifying a particular resource via a particular directory service; and
    creating, by the proxy, a new cache entry in the cache and recording therein a particular distinguished name for the particular resource and an association with the particular directory service.

11. The method of claim 10 further including, servicing, by the proxy, subsequent requests for the particular resource by routing those subsequent requests to the particular directory service identified in the cache until the particular resource is determined to have been updated to each of the directory services at which time the new cache entry is removed from the cache.

12. The method of claim 8 further including:
detecting, by the proxy, that a set of the requests are associated with logging into a particular resource, wherein some of the requests of the set are associated with different ones of the directory services than other ones of the requests from the set; and
ensuring, by the proxy, an access policy for the particular resource is enforced across the whole set of requests regardless of identities associated with the directory services being used with the requests of the set.

13. The method of claim 8, wherein enforcing further includes evaluating the policy to make the selection in response to processing load associated with each of the directory services or associated with environments of the directory services.

14. The method of claim 8, wherein enforcing further includes evaluating the policy to make the selection in response to an identity of a user making the particular request.

15. A system, comprising:
a proxy cache embodied within memory of a machine; and
a proxy service implemented to process on the machine, the proxy service is to intercept requests for directory resources, the requests made from clients to directory services, the requests are distributed directory system operations directed to the directory services, and the proxy service is to inspect the proxy cache for entries having distinguished names for the directory resources and associations to the directory services, each entry representing a remote environment for a replica of a distributed directory system, and when a particular association is noted the proxy service is to route a particular request to a particular directory service otherwise the proxy service is to use policy to route the particular request to a selected directory service, each entry in the proxy cache representing a particular directory resource that has been added or modified by one of the directory services but not yet synchronized to the distributed directory system, and the remote environment includes the up-to-date version of the particular directory resource that can process the distributed directory system operations, and the remote environment is one of the replicas of the distributed directory system, and when the distinguished names are not present in the cache, the distributed directory system operations are routed to any of the replicas, each replica having the particular directory resource to process the distributed directory system operations.

16. The system of claim 15, wherein the proxy service is to flush the particular association from the proxy cache when a particular resource associated with the particular association is updated to each of the directory services.

17. The system of claim 15, wherein the proxy service is a lightweight directory access protocol (LDAP) enabled service that is configured to handle LDAP requests being made from the clients and directed to LDAP directory services.

18. The system of claim 15, wherein the directory services are configured to operate as the distributed directory system, wherein each directory resource is replicated to distributed environments within the distributed directory system, and wherein each directory service handles requests for a particular or a particular set of the distributed environments.

19. The system of claim 18, wherein the proxy service is to load balance among the distributed environments by enforcing the policy.

20. The system of claim 18, wherein the proxy service is to enforce login restrictions to selective resources across each of the distributed environments and each of the directory services.

21. The system of claim 15, wherein the proxy service is a configured to operate as a transparent proxy, which the clients are unaware of.

22. A system, comprising:
a plurality of directory services, each directory service is to be implemented and processed on a machine of a network; and
a centralized caching service implemented and to process on a particular machine of the network, each directory service is to manage and to service directory resources of a distributed directory system, and the centralized caching service is to manage identities to particular directory resources and particular directory services for which changes have been made but are as of yet unsynchronized with each of the directory services of the distributed directory system, each entry in cache managed by the centralized caching service representing a particular directory resource that has been modified or added but not yet synchronized to the distributed directory system, and each entry representing a remote environment for a replica of the distributed directory system, and the remote environment includes the up-to-date version of the particular directory resources that can process distributed directory system operations, and the remote environment is one of the replicas of the distributed directory system, and when distinguished names for the particular directory resources are not present in the cache, the distributed directory system operations are routed to any of the replicas, each replica having the particular directory resources to process the distributed directory system operations.

23. The system of claim 22, wherein the centralized caching service is to route requestors of the particular directory resources to the particular directory services when references to the identities appear in cache.

24. The system of claim 22, wherein the centralized caching service is to route requestors of the particular directory resources to selective ones of the directory services in response to policy when references to the identities do not appear in cache.

25. The system of claim 22, wherein the centralized caching service is to enforce login policy across the directory services in a centralized fashion.

* * * * *

UNITED STATES PATENT AND TRADEMARK OFFICE
CERTIFICATE OF CORRECTION

PATENT NO. : 7,844,710 B2
APPLICATION NO. : 11/888726
DATED : November 30, 2010
INVENTOR(S) : Pradeep K. Rathi Page 1 of 1

It is certified that error appears in the above-identified patent and that said Letters Patent is hereby corrected as shown below:

In column 10, line 51, in Claim 8, delete "distinguish name" and insert -- distinguished name --, therefor.

In column 12, line 14, in Claim 21, after "service is" delete "a".

Signed and Sealed this
Fifteenth Day of February, 2011

David J. Kappos
*Director of the United States Patent and Trademark Office*